D. W. Crocker,

Railroad Chair,

No. 922. Reissued Mar. 6, 1860.

Witnesses

S. C. Robinson

S. L. Holbrook

Inventor

D. W. Crocker

UNITED STATES PATENT OFFICE.

D. W. CROCKER, OF DEPOSIT, NEW YORK.

IMPROVEMENT IN RAILROAD-CHAIRS.

Specification forming part of Letters Patent No. 22,708, dated January 25, 1859; Reissue No. 922, dated March 6, 1860.

*To all whom it may concern:*

Be it known that I, D. W. CROCKER, of Deposit, in the county of Delaware and State of New York, have invented a new and useful Improvement in Railway-Chairs; and I do hereby declare that the following is a full, clear, and exact description of the same, reference being had to the accompanying drawings, forming part of this specification, in which—

Figure 1:
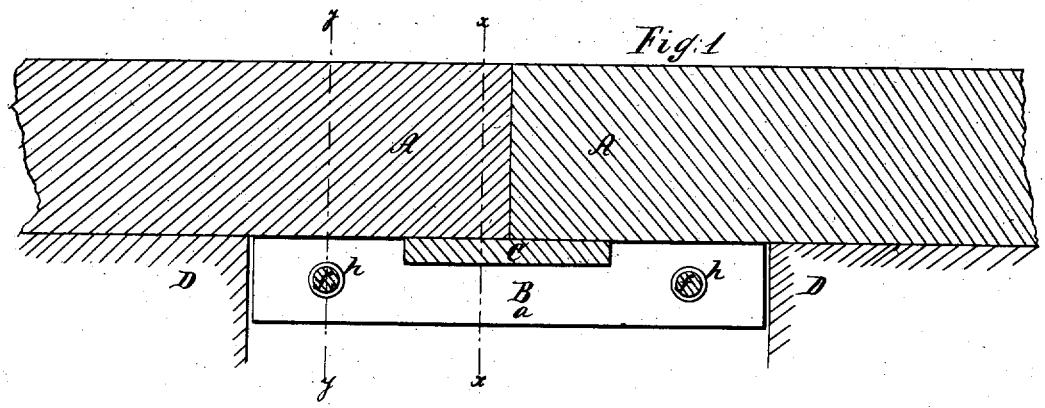
Figure 2:
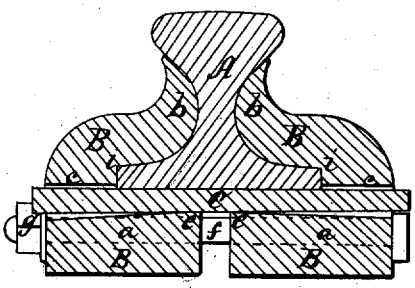
Figure 3:
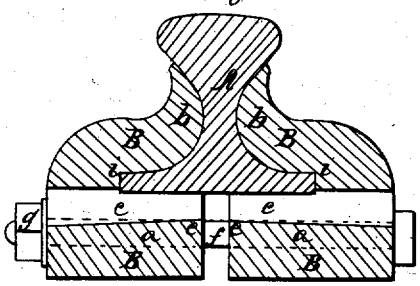
Figure 4:
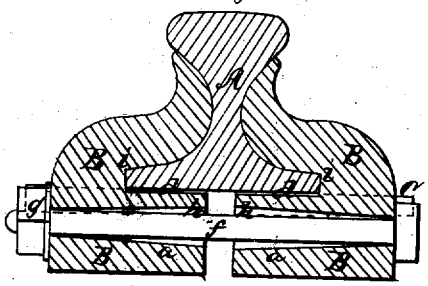

Figure 1 is a central longitudinal vertical section of a railway joint and chair illustrating my improvement. Fig. 2 is a transverse section of the same in the plane indicated by the line *x x* in Fig. 1, showing it complete. Fig. 3 is a similar section, with the tightening key omitted. Fig. 4 is a transverse section of the same in the plane indicated by the line *y y* in Fig. 1.

Similar letters of reference indicate corresponding parts in the several figures.

My invention consists in a peculiar construction of the chair, so that when combined with the rail any weight passing over the rails will cause the jaws of the chair to grip the rails and prevent them from becoming displaced, as hereinafter set forth.

To enable others to make and use my invention, I will proceed to describe its construction and operation.

The invention is more particularly applicable in connection with rails of what is known as the "T" form, but may be applied in connection with rails of other form. The drawings represent its application in connection with the T form of rail.

A A are the ends of the two rails, which may be fitted together squarely, or in any other manner, to form the joint. B B are the two portions of the chair, both alike, each constituting one-half of the base *a a* and one of the jaws *b b*, the jaws being made of a form to fit the bases, necks, and the lower parts of the heads of the rails, whose joint comes in the middle of the chair. *c c* are broad slots made transversely through the two pieces B B at an equal distance from both ends of the chair, with their top faces flush with or slightly higher than and parallel with the top face, *d d*, of the base *a a*, and with their lower faces incling upward from the outer toward the inner edges, as shown in Figs. 2 and 3, so as to leave the inner edges, *e e*, higher than any other portion. *f f* are screw-bolts passing through holes *h h* in the base *a a* of the chair, on either side of the slots *c c*, and furnished with nuts *g g*, to draw the two pieces B B toward each other and make them clamp the rail. The holes *h h* are tapered from the inner sides of the two pieces B B toward the outer sides, so that the bolts fit them snugly at the outside of the chair, but so that enough of room is left around the bolts at the middle of the chair to permit the two pieces B B to oscillate laterally, or, in other words, to have a lever-like action in a lateral direction.

C is a key passing through the slots *c c*, said key being made slightly taper, and one of the slots being made slightly deeper than the other, to correspond with the taper of the key.

In applying these chairs, the sleepers or cross-ties are not placed directly under them, but under the rails at each end of and as close as practicable to the chairs, as indicated at D D in Fig. 1, and the chairs serve to confine the ends of the rails together, both vertically and laterally.

The key C, passing under the bases of the rails at the joint and resting upon the inner edges, *e e*, of the slots in the rails, serves a double purpose—viz., first, by driving the said key at its thicker end it is caused to press harder on the edges *e e*, and so to exert a tendency to depress the base parts *a a* of the two pieces of the chair, and by that means to draw the two jaws more firmly or closely against the sides of and under the heads of the rails, so as to form practically a more rigid joint; and second, the weight of the cars or locomotive passing over either rail at or near the joint, and tending to depress it relatively to the other, is caused to bear upon the key, and the latter thereby caused to press upon the edges *e e* of the slot, and so to produce the same lateral lever-like action upon the two parts B B of the chair as is produced by driving the key, tightening the jaws upon the two rails in such a manner as to prevent the displacement of either relatively to the other and make the joint perfectly rigid. Of course, the above-described action of the weight of the cars or locomotives is only allowed to develop itself in the chair in case of the chair not being properly tightened up by the key C, or of the key having worked loose, or by some imperfection in the chair, and if the jaws could be kept positively tight upon the rail by the key there would be no necessity for such action.

In the above-described lateral lever-like action of the key, the fulcra upon which the two pieces B B work are the angles *i i* of the upper edges of the bases of the rails, and in order that such action may be developed to the best advantage, it is desirable that the insides of the jaws should be so formed as to prevent them bearing upon the rails between the fulcra *i i* and the smallest part of the neck of the rail, and bring the bearing above the smallest part of the neck and under the head of the rail, as is fully illustrated in Figs. 2, 3, and 4.

I do not confine myself to the particular construction of or mode of applying the divided chair herein described; but

What I claim as my invention, and desire to secure by Letters Patent, is—

The construction of the chair as herein shown and described, so that the passing weight will cause the jaws of the chair to grip the rails, as and for the purpose herein shown and described.

D. W. CROCKER.

Witnesses:
S. C. ROBINSON,
S. L. HOLBROOK.